May 17, 1960
T. A. WOOLSEY
2,937,037
FLEXIBLE FLUID LINE COUPLING WITH
SPRING LOADED SEAL RINGS
Filed Aug. 27, 1956
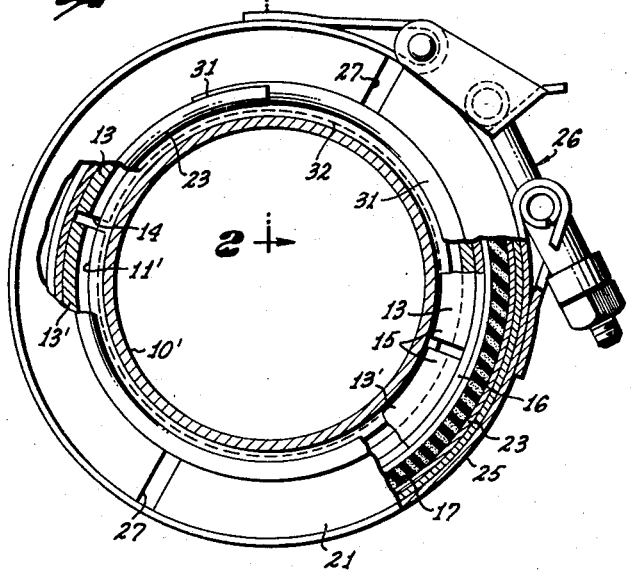
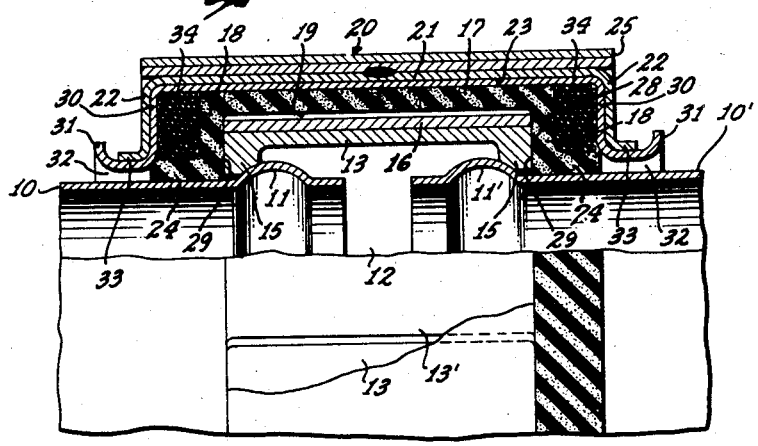
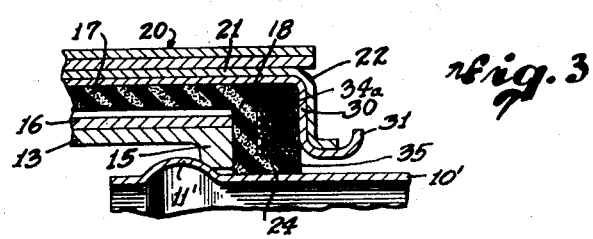
THEODORE A. WOOLSEY,
INVENTOR.
BY Lynn H. Latta
ATTORNEY.

United States Patent Office 2,937,037
Patented May 17, 1960

2,937,037

FLEXIBLE FLUID LINE COUPLING WITH SPRING LOADED SEAL RINGS

Theodore A. Woolsey, Pasadena, Calif., assignor to Aeroquip Corporation, Jackson, Mich., a corporation of Michigan Application August 27, 1956, Serial No. 606,376

3 Claims. (Cl. 285—233)

This invention relates to tube couplings of the type adapted to provide, between adjoining tube sections, a joint having a limited amount of flexibility to accommodate angular misalignment of the tube sections. Its general object is to provide an improved coupling of this general class, embodying means for establishing a fluid seal bridging the joint, together with means for providing a flexible but positive end load transmitting connection directly between the tube sections, without imposing loads upon the sealing means.

More specifically, the invention relates to the type of flexible fluid line joint wherein a direct, positive, flexible end load transmitting connection bridging the joint, is established directly between end beads formed in the adjacent ends of the tubing sections, and wherein a sealing connection, likewise bridging the joint, is established by means including a packing sleeve or a pair of gaskets of compressible material (e.g. soft rubber, synthetic rubber, or equivalent plastic material); wherein such packing means has sealing engagement with the respective tube sections without being subjected to the end loads; and wherein such packing means is surrounded by a sheath of metal or equivalent material which confines it in such a manner as to establish the fluid sealing connections with the respective tube sections and at the same time to contain the end load transmitting means.

A particular type of end load transmitting means which is utilized by the invention is one which embodies a sectional connector collar surrounding and bridging the tubing beads and having respective end flanges projecting radially inwardly and bearing against the remote sides of the beads to take the end loads; and wherein the packing means is simultaneously sealed to the ends of such connector collar and to the respective tubing sections, outwardly of the beads, under compressive confinement by the enveloping sheath.

The primary object of the invention is to provide such a coupling having an improved arrangement for maintaining constant yielding engagement of the packing means against the tubing sections and the ends of the load-bearing connector collar throughout long periods of service. More specifically, the invention aims to provide improved means for resiliently loading the packing means so as to maintain its sealing engagement far beyond the point where the effects of aging and periodic shifting of the parts relative to one another through expansion and contraction, etc., normally would result in relaxing of the sealing engagement, with resultant leakage in a joint carrying fluid under substantial pressure.

A further object is to provide such a coupling having improved means for confining the packing means against escape by extrusion from the ends of the coupling.

In the appended drawing:

Fig. 1 is an end view of a fluid line coupling embodying the invention with parts broken away and shown in section;

Fig. 2 is a fragmentary axial sectional view, partially in side elevation, of the same coupling; and Fig. 3 is a fragmentary sectional view of a modified form.

Referring now to the drawing in detail, I have shown, as an example of one form in which the invention may be embodied, a fluid line coupling wherein a pair of tube sections 10, 10' are provided with end beads 11, 11' at their adjoining ends which are spaced by a gap 12 to accommodate misaligning movements of the tube sections; and wherein a load transmitting connection between the tube sections 10, 10' is provided for by a sectional connector collar 13. Such collar may comprise a pair of ring sections joined end to end as by a threaded connection, as shown in the patent application of Francis Leighton, for Flexible Fluid Line Coupling With Threaded Nipple Type Bead-Bridging Connector, Serial No. 522,742, filed July 18, 1956; or may be of the type shown herein, embodying a pair of segments separated circumferentially by axially extending slots 14 (Fig. 1). The collar 13 has flanges 15 extending inwardly and in bearing engagement with remote faces of beads 11, 11' to provide a load-bearing connection which is positive, yet flexible to permit limited axial misaligning movements of the tube sections.

Where the connector collar 13 is of the segmental type shown herein, it includes a circumferentially continuous sleeve 16 snugly encircling the peripheral surface of its segments and securing them against radial separation.

Fluid sealing is provided by a packing seleeve 17 which surrounds the collar 13 and includes integral gaskets 18 at its respective ends, projecting radially inwardly and in encircling sealing engagement with the respective tube sections 10, 10' outwardly of the beads 11, 11'. The sleeve 17 may be continuous and integral from end to end or may be in sections, divided in a median plane normal to the coupling axis, as indicated in Fig. 2, with the ends of the sections in engagement or adjacent one another. Within the sleeve 17 there is defined an annular recess 19 which accommodates the connector collar assembly.

In the conventional coupling of this general type, the end gaskets are of generally rectangular section and completely fill the annular spaces between the ends of collar 13 and the end of an enclosure sheath which is indicated generally by the numeral 20. Such sheath may comprise a plurality of segments 21 of channel section, having inwardly projecting end flanges 22, together with a segmental liner 23. At their inner extremities, gaskets 18 have axially outwardly projetcing tubular feet 24 which are in encircling engagement with tubing sections 10, 10'. The gaskets 18 and feet 24 cooperatively constitute seal rings of L-section in a plane of the axis. A constrictor band 25 encircles and joins the sheath segments 21, and a take-up connector 26 of a well know type, is utilized for drawing the ends of the band 25 together. Segments 21 are separated circumferentially by slots 27.

Retainer sleeve 16 and segmental collar 13, 15 have registering radial end walls 28 against which seal rings 18, 24 are engaged. Liner 23 has radially inwardly extending end flanges 30 which are axially spaced from end walls 28 to define therewith, between tube sections 10, 10' and the inner peripheral wall of liner 23, a pair of annular seal-ring chambers 29 of rectangular section. Flanges 30 have axially extending cuffs 31 which encircle tube sections 10, 10' with radial clearance (annular spaces 32) such as to accommodate angular misaligning movements of the tube sections. The flanges 22 of the outer sheath segments 21 have annular feet 33 in supporting engagement with cuffs 31.

In existing couplings of this type, the annular seal ring chambers 29 are filled by relatively thick seal rings which initially are placed under axial compression between these radial walls and under radial compression between the inner peripheral wall of the sheath and the tube sections, the resiliency of the gasket material maintaining light sealing engagement such as to establish a seal between the tube sections. Aging coupled with the variations in compression arising from expansion and contraction movements, angular shifting, etc., however, will eventually relax the sealing engagement as the seal rings loose their resiliency and "take a set." Also, the relatively thick gasket bodies tend to extrude outwardly through the annular clearance spaces 32, so that the seal rings loose compression.

The present invention prevents the loss of sealing action through these causes by providing the seal rings of L-section, with relatively thin radial parts 18 and axial feet 24, and by placing both of these parts under light yielding compression provided by springs 34 of closely packed matted mesh structure, of rectangular section normally somewhat larger in both axial and radial dimensions than the annular chambers 29 and installed in these chambers under axial and radial compression. Thus each spring 34 functions to simultaneously exert axial pressure against a radial gasket part 18 and radial pressure against the adjoining foot 24. Unlike the gasket material, the springs 34 will retain their elasticity unimpaired through many years of service, and will offset the declining resiliency of the seal rings by gradually expanding, taking up the clearance developed by gradual shrinkage and setting of the seal rings under compression, and constantly urging the seal rings into yielding compressive engagement with the end walls 28 and tube sections 10, 10'.

Springs 34 are composed of strands of fine spring wire (e.g. of a diameter as small as .01") initially formed into an elongated sleeve of fine woven mesh fabric (similar to the woven structure of a chain fence) and then subjecting such sleeve to axial compression in a compacting die while confining it between rigid inner and outer cylindrical die walls of radial dimensions corresponding to the inner and outer radii of the spring 34 to be produced, thereby reducing its axial dimension to a fraction of its original length, and radially spreading the mesh wall of the sleeve by a crumpling action until it attains the full radial dimension desired in the spring 34, and finally compacting and flattening it to provide the radial end faces of spring 34 which are to bear against gasket part 18 and flange 30 respectively. In the compacting operation, the meshes of the sleeve fabric become matted together in a mat structure that is sufficiently closely matted to provide bearing faces which, though highly porous, are equivalent to solid bearing faces in that they are of sufficiently continuous surface structure to resist penetration by the gasket material. At the same time, the matted structure is sufficiently open, with enough clearance between adjacent convolutions of the wire composing it, to yield to compression to an extent up to one third decrease in dimensions both radially and axially, and retains adequate elasticity to return to its normal dimensions upon release of the compressive forces.

The yieldability in response to unit area pressure is preferably about the same for both spring and gasket material.

In the operation of the coupling, the seal rings and their respective springs are compressed, each to approximately the same degree as the other, both radially and axially, and will collectively operate to maintain yielding pressure of seal ring parts 18 and 24 against end walls 28 and tube sections 10, 10' respectively, to an extent adequate to contain the fluid pressure for which the coupling is designed. Where the packing sleeve 17 is in two sections, as shown, the connector collar assembly functions to extend the sealing connection between the two sections of the packing, and the effective sealing of the gasket parts 18 to the ends of the sleeve 16 is important, even through supplementary sealing in some installations may be obtained by drawing the sheath tightly enough to compress sleeve sections 17 inwardly into sealing contact with the peripheral surface of sleeve 16. Thus the sealing connection is from tube sections 10, 10' to seal ring feet 24 and from gasket parts 18 to the ends of the connector collar assembly for support.

As the gasket material ages, its loss of resiliency is compensated for by borrowing the unimpaired resiliency of springs 34, which, through their capacity for expansion, will absorb any dimensional shrinkage of the seal rings while continuing to maintain substantially constant spring loading thereof.

The above disclosed arrangement of L-section seal rings and springs 34 constitutes a marked improvement over the use of springs such as coil springs and Belleville washer springs in the spring-loading of gaskets, in that the L-rings simultaneously exert sealing pressure against radial walls 28 and the cylindrical surfaces of tube sections 10, 10', and the springs 34 correspondingly exert yielding pressure both axially and radially through bearing surfaces that are equivalent to solid faces in uniformly distributing the pressure over the full areas of the radial and cylindrical faces of the L-section seal rings.

As angular and axial shifting movements between the tube sections 10, 10' occur, the springs 34 will yieldingly accommodate such movements, expanding and contracting either axially or radially, or both, wherever necessary to maintain fully loaded engagement of the seal rings against the surfaces to which they are sealed.

In the modified form of the invention shown in Figs. 3, the springs 34a are of trapezoidal cross-section, each including an annular lip 35 projecting radially inwardly into contact with a respective tube section 10, 10', and completely closing the gap through which the foot 24 of the packing ring might tend to be extruded, and restraining the foot from extrusion. Because of the yieldability of the spring, the lip 35 will yield to angular misalignment movements of the tube section while maintaining its closure action.

I claim:

1. In a tube coupling, in combination: a pair of tube sections having respective external annular end beads; a plurality of collar segments collectively constituting a connector collar of larger diameter than said beads, surrounding said beads and having end flanges extending radially inwardly and directly engaging the remote sides of the beads to establish an end-loading bearing connection directly between the tube sections, with the ends of the tube sections out of contact with one another; rigid means for providing a separable connection between said collar segments; a sleeve of soft compressible resilient material surrounding said connector collar; a pair of seal rings integral with the respective ends of said sleeve, said sleeve and seal rings cooperatively defining an annular recess in which the connector collar is received, said seal rings being of L-section with each being constituted of an annular wall portion and a tubular foot portion, said wall portion extending radially inwardly from a respective end of said sleeve and having a flat outside surface and a flat inside surface, the inside surface being in engagement with a respective end of said connector collar, said tubular foot portion extending axially outwardly from the inner margin of the wall portion and having a free end and a cylindrical inside surface and a cylindrical outside surface, the inside surface of the foot portion being engaged around a respective tube section; a tubular sheath of split collar form surrounding said sleeve and said seal rings and having integral end flanges extending radially inwardly from the sleeve and encircling and spaced from the outside surface of the tube sections to accommodate angular misaligning movements of the tube sections, the outside surfaces of said wall portions and the outside surfaces of said tubular foot portions and the inside surfaces of the sheath and of the end flanges of the sheath defining two annular chambers; and a pair of annular springs of woven spring wire matting disposed in respective chambers, and being compressed by direct and flush engagement throughout the walls defining said chambers, whereby the springs exert both axial and radial pressure against the seal rings.

2. A coupling as defined in claim 1, wherein annular spaces of rectangular cross section are defined between the outer faces of said seal rings and end flanges of said sheath, and wherein said spring rings are received in said spaces and are of rectangular cross section, normally slightly larger in area than the cross-section area of said spaces, whereby to establish both axial and radial compression in said springs as confined in said spaces.

3. A coupling as defined in claim 1, wherein said spring includes an annular lip at its outer end face, extending inwardly past the end of said seal ring foot portion and yielding engaged against the respective tube section to provide a closure restraining said foot portion against extrusion along the tube section.

References Cited in the file of this patent

UNITED STATES PATENTS

| | | |
|---|---|---|
| 1,674,762 | Clark | June 26, 1928 |
| 1,893,814 | Widin | Jan. 10, 1933 |
| 2,088,703 | Hubbard | Aug. 3, 1937 |
| 2,290,507 | Thompson | July 21, 1942 |
| 2,376,039 | Driscoll et al. | May 15, 1945 |
| 2,407,445 | Phillips | Sept. 10, 1946 |
| 2,431,120 | Howe | Nov. 18, 1947 |
| 2,744,718 | Markowski | May 8, 1956 |
| 2,778,628 | Johnson | Jan. 22, 1957 |
| 2,778,629 | Johnson | Jan. 22, 1957 |
| 2,778,661 | Leighton | Jan. 22, 1957 |